(12) United States Patent
Tendyra et al.

(10) Patent No.: US 11,274,484 B2
(45) Date of Patent: Mar. 15, 2022

(54) DOOR SYSTEM WITH A DECELERATION MECHANISM

(71) Applicant: AIRBUS HELICOPTERS DEUTSCHLAND GMBH, Donauworth (DE)

(72) Inventors: Thomas Tendyra, Schwenningen (DE); Uwe Renner, Friedberg (DE); Xaver Pascoe, Munich (DE); Markus Buehlmeyer, Buttenwiesen (DE); Stephen Ward, Donaumuenster (DE); Guido Borchers, Augsburg (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 218 days.

(21) Appl. No.: 16/687,963

(22) Filed: Nov. 19, 2019

(65) Prior Publication Data

US 2020/0270926 A1 Aug. 27, 2020

(30) Foreign Application Priority Data

Feb. 27, 2019 (EP) .................................... 19400008

(51) Int. Cl.
*E05F 15/00* (2015.01)
*E05F 5/02* (2006.01)
(Continued)

(52) U.S. Cl.
CPC ................ *E05F 5/025* (2013.01); *B64C 1/00* (2013.01); *B64C 1/1469* (2013.01); *E05B 77/54* (2013.01);
(Continued)

(58) Field of Classification Search
CPC ... B64C 1/1469; B64C 1/00; B64C 2001/009; E05F 5/00; E05F 5/025; E05F 15/60;
(Continued)

(56) References Cited

U.S. PATENT DOCUMENTS

| 3,809,419 | A | 5/1974 | Chezem |
| 4,230,350 | A * | 10/1980 | Gee ........................ F24C 15/022 |
| | | | 292/144 |
| 10,774,569 | B1 * | 9/2020 | Edwards ................ E05C 19/004 |
| 10,940,933 | B2 * | 3/2021 | Tendyra .............. E05B 17/0041 |

(Continued)

FOREIGN PATENT DOCUMENTS

EP 1832508 B1 9/2007
WO 2016057578 A1 4/2016

OTHER PUBLICATIONS

European Search Report for European Application No. EP 19400008. 9, Completed by the European Patent Office, dated Jul. 29, 2019, 8 pages.

*Primary Examiner* — Chi Q Nguyen
(74) *Attorney, Agent, or Firm* — Brooks Kushman P.C.

(57) ABSTRACT

A deceleration mechanism for a door system. In particular, a door system that is adapted to control an opening of a door module that separates compartments of an aircraft, the door module comprising a door panel that performs a rotational movement above a floor structure of the aircraft during an opening of the door module, comprises a deceleration mechanism that comprises a bolt, a bolt moving mechanism that is attached to the bolt, a latch mechanism that is removably connected to the bolt moving mechanism an activation mechanism that is attached to the latch mechanism, and a brake element that is rigidly attached to the bolt.

20 Claims, 5 Drawing Sheets

(51) Int. Cl.
  *E05F 15/60* (2015.01)
  *B64C 1/00* (2006.01)
  *B64C 1/14* (2006.01)
  *E05B 77/54* (2014.01)

(52) U.S. Cl.
  CPC ........ *E05F 15/60* (2015.01); *B64C 2001/009* (2013.01); *E05Y 2900/502* (2013.01); *E05Y 2900/531* (2013.01)

(58) Field of Classification Search
  CPC ... E05B 77/54; E05B 51/023; E05Y 2400/36; E05Y 2800/40; E05Y 2900/502; E05Y 2201/21; E05Y 2900/531
  USPC .................. 49/394, 381, 382, 384, 386, 388
  See application file for complete search history.

(56) References Cited

U.S. PATENT DOCUMENTS

| | | | |
|---|---|---|---|
| 2003/0066930 A1* | 4/2003 | Pratt | B64C 1/1469 244/118.5 |
| 2006/0048449 A1 | 3/2006 | Roques et al. | |
| 2008/0054123 A1* | 3/2008 | French | B64C 1/1469 244/129.5 |
| 2008/0190151 A1* | 8/2008 | Ritt | E05F 17/004 70/95 |
| 2016/0144944 A1* | 5/2016 | Goings | E05F 11/54 244/129.5 |
| 2016/0186470 A1 | 6/2016 | Finley et al. | |
| 2019/0301229 A1* | 10/2019 | Kitamura | E05F 15/614 |
| 2020/0115028 A1* | 4/2020 | Tendyra | E05B 17/0041 |
| 2020/0224462 A1* | 7/2020 | Renner | E05B 47/026 |
| 2020/0277815 A1* | 9/2020 | Tendyra | E05F 15/72 |

* cited by examiner

DOOR SYSTEM WITH A DECELERATION MECHANISM

CROSS-REFERENCE TO RELATED APPLICATIONS

This application claims priority to European patent application No. EP 19400008.9 filed on Feb. 27, 2019, the disclosure of which is incorporated in its entirety by reference herein.

BACKGROUND OF THE INVENTION

(1) Field of the Invention

The present embodiments relate to a deceleration mechanism for a door system, and, more particularly, to a mechanism for decelerating a door opening movement in case of a compartment decompression in an aircraft.

(2) Description of Related Art

Most aircrafts have a door that separates the cockpit from the remaining portions of the aircraft. For example, due to safety concerns, commercial aircrafts usually have a door that separates the cockpit (i.e., the pilot area) from the cabin (i.e., the passenger area). The door that separates the cockpit from the cabin is sometimes also referred to as the cockpit door.

When cruising at high altitudes, the cockpit and cabin of aircrafts are usually pressurized at a pressure that is higher than the ambient pressure. In some situations, the pressure in the cockpit may drop rapidly and become much lower than the pressure in the cabin. For example, a bird may strike and break a cockpit window causing such a rapid pressure drop in the cockpit. In this case, a fast decompression inside of the cabin is necessary to avoid an aggravation of the situation in which the structural loads of the aircraft could exceed its load limits which would ultimately result in a crash of the aircraft.

Generally, the cockpit door aboard the aircraft provides the primary means of dissipating pressure from the cabin to the cockpit during a cockpit decompression case. A cockpit decompression case may occur as a minimal opening involving relatively slow bleed pressure or as a maximum opening involving a rapid loss of pressure. To ensure that the difference in pressure between the cabin and the cockpit does not exceed structural limitations of the aircraft, the cockpit door must be released and opened within a short time period. The time for opening the cockpit door includes the time for releasing the door lock and the time for rotating the door into an open position.

To satisfy certification requirements defined by aviation authorities, it has to be demonstrated that an aircraft can sustain a decompression case without a subsequent loss of essential structure/equipment and life. For example, JAR 25.365(e)(2) specifies that the aircraft structure must be able to withstand the depressurization caused by an instant opening of a predetermined area in the pressurized shell at any operating altitude.

Document U.S. Pat. No. 3,809,419 A describes an occupant safeguarding door stop means that is expressly designed and adapted for protective use on an interior surface near the lower edge and corner portion of a vertically hinged inwardly openable door. It comprises a mounting base or bracket screwed or otherwise fixed, and a complemental leg member hingedly mounted and depending and having a laterally directed contoured foot portion whose underneath side is equipped with a normally elevated anti-slipping floor engaging shoe. Spring means functions to yieldingly lift and release the foot-equipped leg and permits the leg to be forced down to the desired door stop position. Releasable spring-loaded latching means functions to hold the door stop in its safety door retaining position.

Document WO 2016/057573 A1 describes a removable, remotely-controlled door locking apparatus that is provided in order to secure a door in a locked (or locked open) position without a key, such as to resist a forced entry through the door, and which includes a housing configured for temporary fixed engagement to a portion of the door. The housing has a front facing surface sloped forward and downward at an angle from horizontal as taken from a top to a bottom of the apparatus, and an actuator arranged therein so as to be substantially parallel to the sloping front facing surface between upper and lower ends thereof. The apparatus may further include a movable foot attached to the actuator and configured, under actuator control, to be extended in a lock state against a floor surface to secure the door or retracted in an unlock state, based on a wireless signal received from a remote smart device.

Most of the described solutions merely secure the door in a given position. However, neither of these solutions describe a deceleration mechanism that decelerates an opening of a door panel in case of a rapid decompression case.

Document EP 1 832 508 B1 describes an operation mechanism that is adapted for activating a deceleration device for decelerating an opening movement of a door. The operation mechanism features a first and a second mode of operation. In the first mode of operation the operation mechanism allows free rotation of the door, when the operation mechanism is loaded by an impulse of the door below a predetermined threshold value. In the second mode of operation when the operation mechanism is loaded by an impulse of the door above the predetermined threshold value the operation mechanism decelerates free rotation of the door by connecting the door to the deceleration device which will then decelerate the acceleration of the door.

However, most of the current solutions that open a door when a difference in pressure is detected are based on door systems that have a coupling mechanism that connects the door to the deceleration device. These solutions involve additional potential failure sources. For example, the coupling mechanism may fail in case of an emergency. Moreover, deceleration systems with a coupling mechanism are often complicated and heavy.

BRIEF SUMMARY OF THE INVENTION

Based on the limitations and drawbacks of the prior art, an objective is to provide a door system for controlling an opening of a door that separates compartments of an aircraft, and that comprises a door panel and a deceleration mechanism. The door system should enable a controlled opening of the door when the air pressure difference between the area that is separated by the door exceeds a predetermined threshold. The door system should have a simple and light-weight design, have less failure sources than current door systems, and be easy to install. The deceleration mechanism should be fast, reliable, and operate without a coupling mechanism.

This objective is solved by an apparatus comprising the features of claim 1.

More specifically, a door system that is adapted to control an opening or a door module that separates compartments of an aircraft, whereby the door module comprises a door panel that performs a rotational movement above a floor structure of the aircraft during an opening of the door module, comprises a deceleration mechanism that is attached to a lower region of the door panel. The deceleration mechanism comprises a bolt, a bolt moving mechanism that is attached to the bolt, a latch mechanism that is removably connected to the bolt moving mechanism and adapted to block the bolt moving mechanism in a normal mode and to release the bolt moving mechanism in a deceleration mode, an activation mechanism that is attached to the latch mechanism and adapted to switch the latch mechanism from the normal mode to the deceleration mode when a predetermined air pressure difference threshold between the compartments of the aircraft is exceeded, and a brake element that is rigidly attached to the bolt. The bolt moving mechanism, upon release, presses the bolt against the brake element such that the brake element pushes against the floor structure, thereby decelerating the rotational movement of the door panel.

In some embodiments, the deceleration mechanism may be integrated on the lower region of the door panel. The deceleration mechanism may be activated in case of a fast decompression situation in the cockpit of the aircraft. In response to an activation of the deceleration mechanism, a deceleration of the door panel may start due to the interface between the deceleration mechanism and a carpet that covers the floor structure and is used as a means for deceleration.

The carpet may continue to be folded during the opening of the door module and decelerate the rotational movement of the door panel. Therefore, the carpet may need a predetermined construction or a predetermined attachment in order to provide a reliable folding in this area.

As a result, the door system may have less failure sources than conventional door systems. The deceleration mechanism may be simply installed and require a low maintenance effort while providing a fast and reliable activation of the deceleration function. Furthermore, the system is well suited for retrofitting and a coupling mechanism may be omitted.

According to one aspect, the door module comprises a door locking system that is at least partially arranged on the door panel and maintains the door panel in the closed position.

According to one aspect, the door locking system is adapted to release the door panel from the closed position when the predetermined air pressure difference threshold between the compartments of the aircraft is exceeded.

According to one aspect, the door system comprises a control unit that is connected to at least one of the activation mechanism or the door locking system and generates a trigger signal when the predetermined air pressure difference threshold between compartments is exceeded.

According to one aspect, the activation mechanism comprises an electrical activation element that is adapted to activate the activation mechanism in response to the trigger signal of the control unit.

According to one aspect, the electrical activation element comprises at least one of a solenoid, an electrical actuator, a pyrotechnic actuator, or a gas cartridge.

According to one aspect, the activation mechanism comprises a mechanical activation element that activates the activation mechanism when an acceleration of the rotational movement of the door panel is above a predetermined acceleration threshold.

According to one aspect, the predetermined acceleration threshold is selected based on a predetermined mass inertia of the door panel.

According to one aspect, the bolt moving mechanism exerts a predetermined pressure on the bolt that is selected at least based on the predetermined mass inertia of the door panel.

According to one aspect, the bolt moving mechanism and the latch mechanism exhibit an interface with a friction that is based at least partially on the predetermined pressure that the bolt moving mechanism exerts on the bolt.

According to one aspect, the floor structure is covered by a carpet, and the brake element detaches the carpet from the floor structure in the deceleration mode.

Furthermore, a method of using the door system for controlling an opening of a door module that separates first and second compartments of an aircraft, the door module comprising a door panel that performs a rotational movement above a floor structure of the aircraft during an opening of the door module, comprises determining whether a difference between a first air pressure of the first compartment and a second air pressure of the second compartment exceeds a predetermined air pressure difference threshold, in response to determining that the difference between the first air pressure of the first compartment and the second air pressure of the second compartment exceeds the predetermined air pressure difference threshold, unlocking a door locking system and releasing the door panel from a closed position. The method further comprises activating an activation mechanism, releasing a latch mechanism with the activation mechanism, releasing a bolt moving mechanism with the latch mechanism, with the bolt moving mechanism pressing a bolt against a brake element, and pushing the brake element onto the floor structure to decelerate the rotational movement during the opening of the door panel.

According to one aspect, the floor structure is covered by a detachable carpet, and pushing the brake element onto the floor structure to decelerate the rotational movement during the opening of the door panel comprises detaching the detachable carpet with the brake element, and wrinkling the detachable carpet to decelerate the rotational movement during the opening of the door panel.

According to one aspect, the activation mechanism comprises a hinge, and releasing the bolt moving mechanism with the latch mechanism comprises moving the latch mechanism relative to the bolt moving mechanism based on a mass inertia of the door panel.

According to one aspect, the activation mechanism comprises at least one of a solenoid, an electric actuator, a pyrotechnical activation device, or a gas cartridge, and releasing the bolt moving mechanism with the latch mechanism comprises moving the latch mechanism relative to the bolt moving mechanism with the at least, one of a solenoid, an electric actuator, a pyrotechnical activation device, or a gas cartridge.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Exemplary embodiments may be included in any vehicle with a door that separates two pressurized compartments, and in which a rapid change in pressure in only one of the compartments would compromise the structural integrity of the vehicle. Examples of such vehicles may include aircrafts such as airplanes, multicopters, helicopters, drones, etc.

Figure 1:
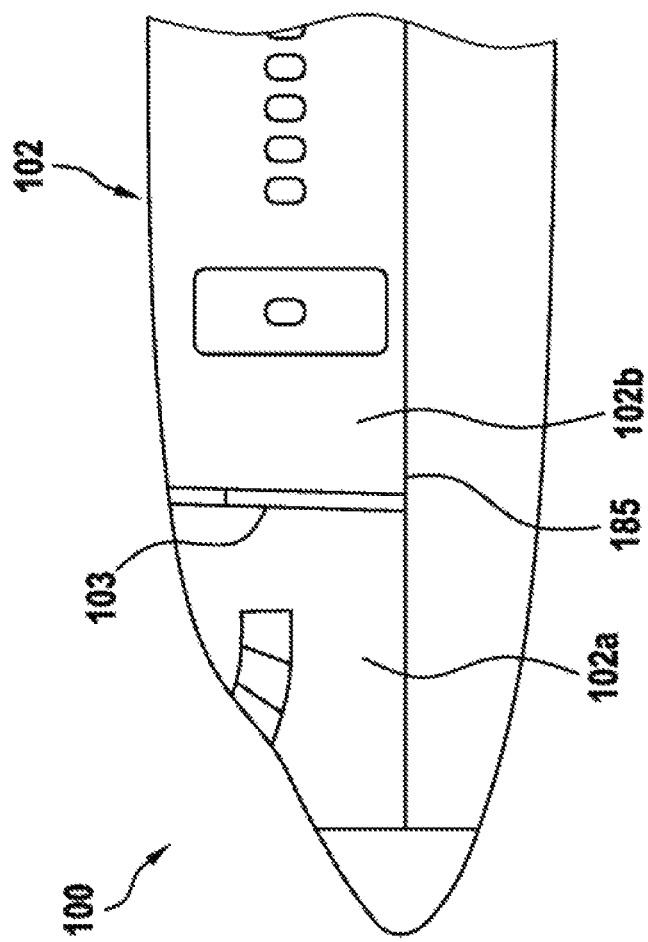
FIG. 1 is a diagram of an illustrative aircraft with a door module in accordance with some embodiments.

FIG. 1 shows an example of a vehicle 100. As shown in FIG. 1, vehicle 100 may be an aircraft, and, more particularly, an airplane. Aircraft 100 is exemplarily embodied with fuselage 102 that includes compartments 102a and 102b. A structural separation may separate compartments 102a and 102b of aircraft 100 from each other. The structural separation may include a door module 103.

In some embodiments, compartments 102a, 102b may include the cockpit, the cabin, the cargo compartment, etc. As an example, door module 103 may provide access between the cockpit and the cabin of aircraft 100. As another example, door module 103 may provide access between the cockpit and the cargo compartment, or between the cabin and the cargo compartment.

Door module 103 may have a door frame and a door panel. The door panel may be attached to the door frame with hinges. During the opening of the door module, the door panel may perform a rotational movement above floor structure 185 of aircraft 100.

If desired, door module 103 may provide a function for dissipating a pressure difference between compartments 102a and 102b of aircraft 100. For example, compartments 102a and 102b may be pressurized, and door module 103 may dissipate the pressure difference between compartments 102a and 102b in case of a rapid decompression of one of compartments 102a or 102b.

Rapid decompression may occur as a result of structural damage to one of compartments 102a or 102b. Releasing door module 103 from a closed position and enabling a rapid opening of door module 103 in case of a rapid loss of pressure in one of compartments 102a or 102b may prevent further damage to aircraft 100 by ensuring the establishment of equal pressure in both compartments 102a and 102b.

Figure 2:
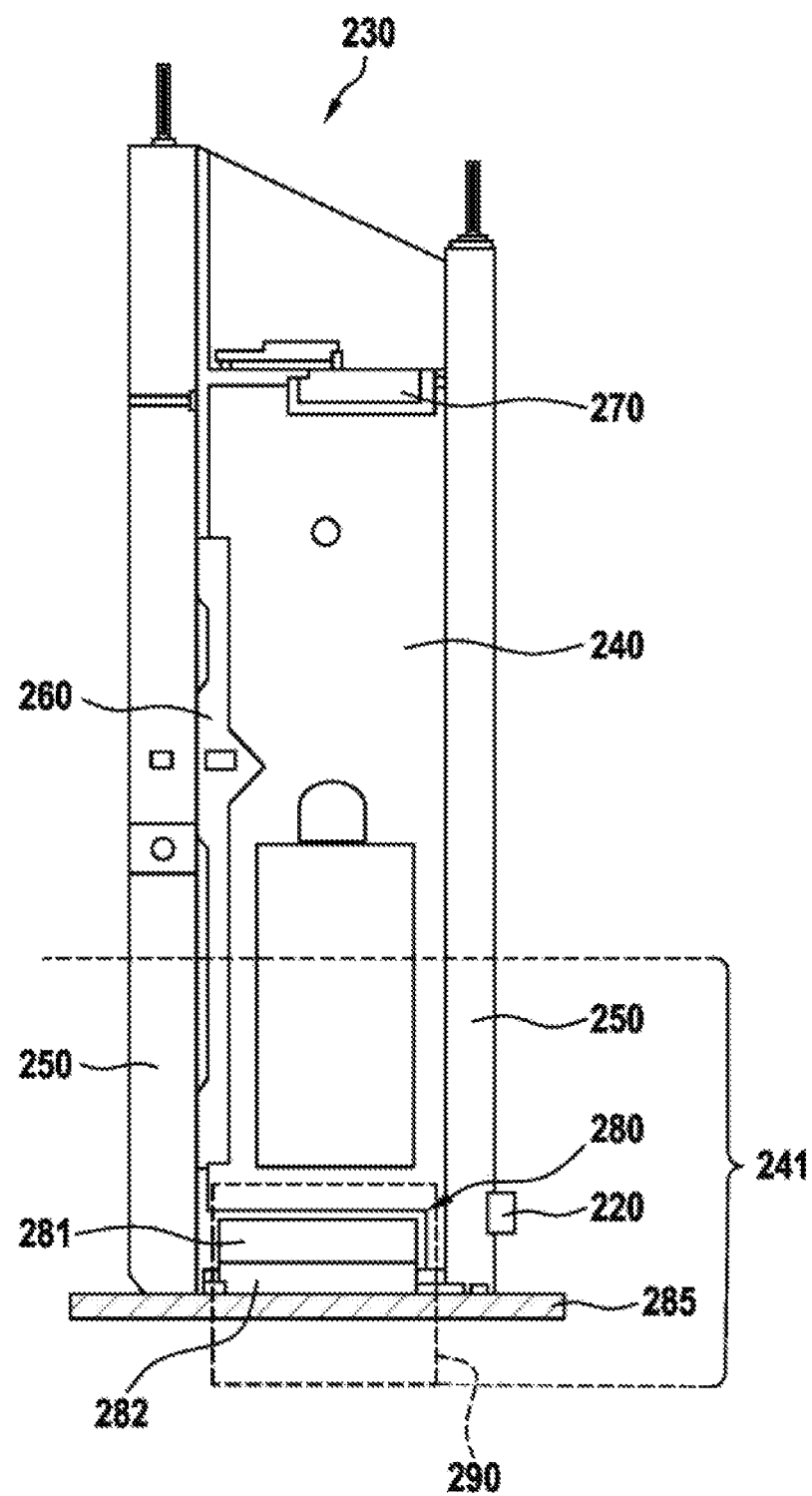
FIG. 2 is a diagram of an illustrative door module with a door system in accordance with some embodiments.

FIG. 2 shows illustrative door module 230 that may include mechanical end stop 220, door panel 240, door frame 250, door locking system 260, door damper 270, and door system 290. Door system 290 may include deceleration mechanism 280 that is attached to lower region 241 of door panel 240.

In some embodiments, mechanical end stop 220 may be attached to door frame 250. If desired, mechanical end stop 220 may be attached to any other surface that enables mechanical end stop 220 to limit the opening of door panel 240.

Door damper 270 may bias door panel 240 into a closed position. Door damper 270 may be mounted on door panel 240. However, door damper 270 may be mounted on any other surface that enables door damper 270 to bias door panel 240 into the closed position. For example, door damper 270 may be mounted on door frame 250, on a surface above door frame 250, on a surface that is perpendicular to door frame 250, etc.

For limiting the speed at which door panel 240 is closed, the door damper 270 may use hydraulic (e.g., oil-filled) dampers. In some embodiments, spring mechanisms may be used for closing door panel 240. For example, door damper 270 may include a compression or torsion spring that stores the energy used in the opening of door panel 240. The spring may release the stored energy to close door panel 240. If desired, door damper 270 may allow for adjustment of the strength of the spring, making it easier or more difficult to push door panel 240 open.

Door locking system 260 may maintain door panel 240 in a closed position. In other words, door locking system 260 may maintain door panel 240 in a position in which door panel 240 closes door frame 250, thereby denying access through door frame 250. Door locking system 260 may be arranged on door panel 240 and/or on door frame 250.

To satisfy current safety regulations for passenger aircrafts, door module 230 may fee locked (i.e., door locking system 260 may maintain door panel 240 in a position in which door panel 240 closes door frame 250) as soon as the aircraft leaves the parking area and for the entire duration of the flight. Door locking system 260 may include a set of electric strikers or bolts that is installed in the side of door panel 240 (i.e., at the edge of the door or near the edge of the door).

In a locked position, these strikers or bolts are inserted in tumblers mounted in door frame 250 or in openings of door frame 250 that are adapted to receive the strikers or bolts. If desired, the strikers or bolts may be controlled electrically. More specifically, the strikers or bolts may be powered continuously to ensure that door locking system 260 maintains door panel 240 in a locked position. When the electric power supply is cut off, the strikers or bolts may slide toward an unlocked position, if desired.

In some embodiments, door locking system 260 may release door panel 240 from the closed position under predetermined conditions. For example, door locking system 260 may release door panel 240 from the closed position, if a predetermined air pressure difference threshold between compartments (e.g., compartments 102a and 102b of aircraft 100 of FIG. 1) is exceeded. Thus, door module 230 may ensure decompression of the compartment with the higher air pressure, thereby harmonizing the air pressure between the compartments.

For example, door module 230 may separate a cockpit of an aircraft from a cabin of the aircraft. In other words, the compartments (e.g., compartments 102a and 102b of aircraft 100 of FIG. 1) are embodied by the cockpit and the cabin, respectively. Door panel 240 may be placed perpendicular to floor structure 235 of the aircraft. Door panel 240 may be mounted on door frame 250 by hinges that are aligned along an axis perpendicular to the surface of floor structure 285.

In some embodiments, the hinges may be located on the cockpit side of door panel 240 so that the hinges are inaccessible from the cabin. Door module 230 may have no gaps between door panel 240 and door frame 250, if desired.

In some embodiments, door panel 240 and door frame 250 may allow the opening of door panel 240 toward the cockpit. It is understood that door panel 240 may be mounted on door frame 250 in a different way. As an example, the hinges may be located on the cabin side of door panel 240 and/or door panel 240 may open toward the cabin.

Upon the release of door locking system 260, door panel 240 may perform a rotational movement around an axis defined by the hinges, thereby moving door panel 240 from the closed position to an open position. For example, door panel 240 may be manually moved, moved by a pressure difference, or by a biasing device from the closed position to the open position upon the release of door locking system 260.

If desired, door system 290 may override door locking system 260 and release door panel 240 from the closed position. For example, door system 290 may release door panel 240 from the closed position when a difference in pressure between the compartments of an aircraft (e.g., compartments 102a, 102b of aircraft 100 of FIG. 1) exceeds a predetermined threshold. Thus, door system 290 may ensure decompression of the compartment with the higher air pressure, thereby harmonizing the air pressure between the compartments.

If desired, door system 290 may be adapted to control the opening of door module 230 under predetermined conditions. For example, door system 290 may control the opening of door module 230 if a predetermined air pressure difference threshold between the compartments is exceeded. Such a predetermined air pressure difference may be based on structural specifications of the aircraft and/or on regulations.

In some embodiments, door system 290 may ensure harmonization of the air pressure between the compartments within a predetermined time interval. Harmonization of the air pressure may be achieved by an opening of door module 230 that separates the compartments of the aircraft (e.g., compartments 102a, 102b of FIG. 1).

For example, door system 290 may ensure a rapid opening of door panel 240 from the closed position to a first open position to ensure a harmonization of the air pressure between the compartments of the aircraft within a predetermined time interval. Subsequently, door system 290 may decelerate the opening of door panel 240 between the first open position and a second open position to prevent door panel 240 from crashing into a side wall of the aircraft.

As shown in FIG. 2, door system 290 may include deceleration mechanism 280 that is attached to lower region 241 of door panel 240. Deceleration mechanism 280 may decelerate the opening of door panel 240. Deceleration mechanism 290 may include casing 281 and brake element 282. Brake element 282 may be arranged outside of casing 281 and above floor structure 285.

Figure 3A:
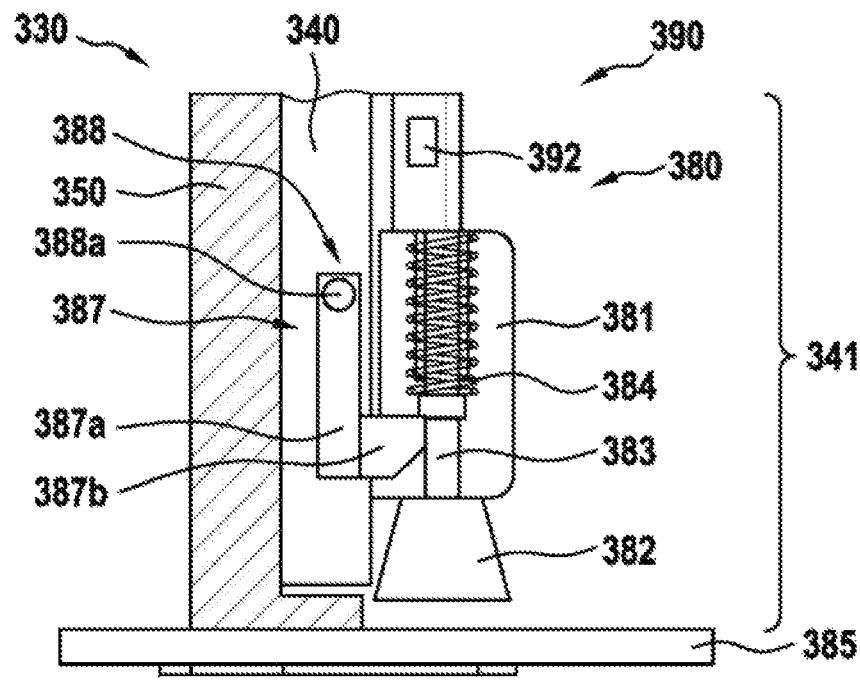
FIG. 3A is a diagram of an illustrative door module with a door pond in a closed position and a door system with a deceleration mechanism in a normal mode in accordance with some embodiments.
Figure 3B:
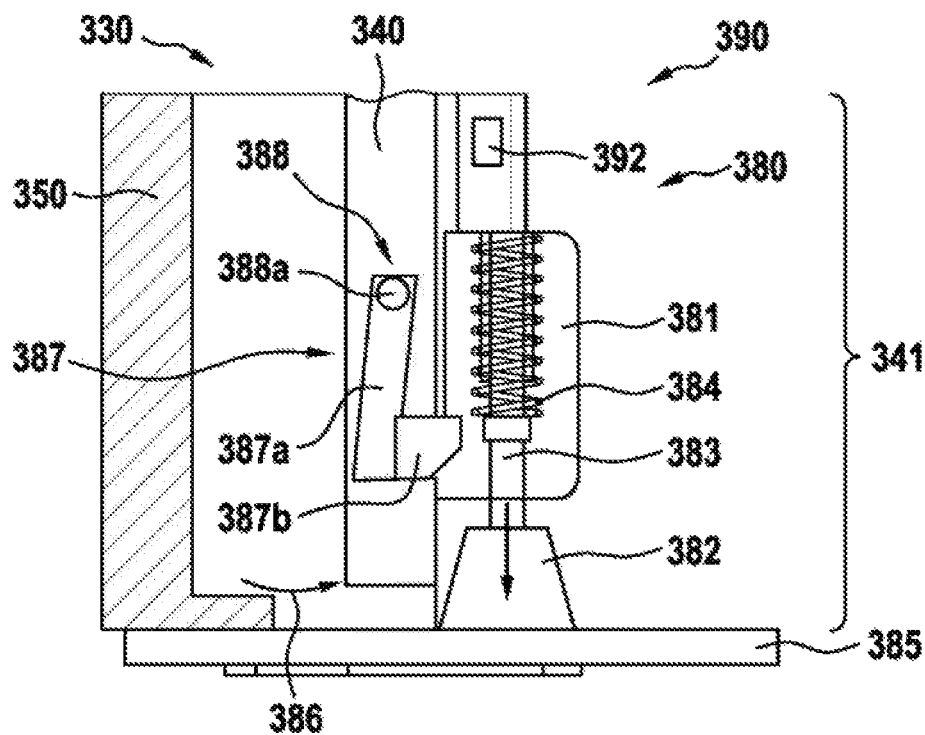
FIG. 3B is a diagram of an illustrative door module with a door panel that performs a rotational movement above a floor structure and a door system that includes a deceleration mechanism in a deceleration mode in accordance with some embodiments.

FIGS. 3A and 3B show door module 330 with door panel 340 in a closed position and an open position, respectively. Door module 330 may include door panel 340, door frame 350, and door system 390, which may include control unit 392 and deceleration mechanism 380 that is attached to a lower region 341 of door panel 340. Door panel 340 may be placed perpendicular to floor structure 385 of an aircraft, such as aircraft 100 of FIG. 1.

Deceleration mechanism 380 may include casing 381, bolt 383, brake element 382 that is rigidly attached to bolt 383, bolt moving mechanism 384 that is attached to bolt 383, latch mechanism 387 that is attached to bolt moving mechanism 384, and activation mechanism 383 that is attached to latch mechanism 387.

In some embodiments, casing 381 of deceleration mechanism 380 may at least be partially integrated into door panel 340. Casing 381 may encompass bolt 383 and bolt moving mechanism 384.

If desired, latch mechanism 387 may be mounted on door panel 340. Latch mechanism 387 may include pivot arm 387a and blocking component 387b that is rigidly attached to pivot arm 387a. Blocking component 387b may be removably connected to bolt moving mechanism 384. Blocking component 387b may be adapted to block bolt moving mechanism 384 in a normal mode.

Bolt moving mechanism 384 may include a spring-loaded mechanism. For example, as shown in FIG. 3A, bolt moving mechanism 384 may include a compression spring that is attached to bolt 383. The spring may be loaded in response to a compression that is provided by blocking component 387b.

The cross-section of blocking component 387b may have any shape that is adapted to block bolt moving mechanism 334 in normal mode. As shown in FIGS. 3A and 3B, the cross-section of blocking component 387b may have a square shape of which a triangle has been removed.

Pivot arm 387a may connect blocking component 387b with activation mechanism 388.

FIG. 3A shows door module 330 in a closed position and deceleration mechanism 380 with latch mechanism 387 operating in normal mode. FIG. 3B shows door module 330 in an open position.

As an example, consider the scenario in which door module 330 is opened slowly. For example, a person may open door module 330 by unlocking a door locking system (e.g., door locking system 260 of FIG. 2) and moving door panel 340 from the closed position to the open position. In this scenario, door panel 340 may perform rotational movement 386 without any deceleration.

Activation mechanism 388 may switch latch mechanism 387 from the normal mode to a deceleration mode by exerting a rotational force to pivot arm 387a when the predetermined air pressure difference threshold between two compartments that are separated by door module 330 (e.g., compartments 1025, 102b of FIG. 1) is exceeded.

If desired, activation mechanism 388 may include activation element 388a that activates activation mechanism 388 in response to a trigger. As an example, consider the scenario in which the trigger is a signal that is provided by control unit 392 of door system 390.

Control unit 392 may be connected to activation mechanism 388 and/or the door locking system and may generate a trigger signal when the predetermined air pressure difference threshold between compartments that are separated by door module 330 (e.g., compartments 102a, 102b of FIG. 1) is exceeded. In this scenario, activation element 388a may include an electrical activation element 388a that activates activation mechanism 388 in response to the trigger signal from the control unit 392.

If desired, electrical activation element 388a may include at least one of a solenoid, an electrical actuator, a pyrotechnic actuator, or a gas cartridge. In some embodiments, electrical activation element 388a may override the door locking system that keeps door panel 340 in the closed position.

For example, the door locking system may have a latching element that protrudes from door panel 340 and extends into door frame 350. In this example, a solenoid, a pyrotechnical actuator, or any other electrical activation element 388a may push from the door frame 350 against the latching element of the door locking system such that the latching element no longer protrudes from door panel 340, and thus no longer maintains door panel 340 in the closed position.

As an example, consider the scenario in which the air pressure difference between two compartments that are separated by door module 330 (e.g., compartments 102a, 102b of FIG. 1) needs to be equalized rapidly (e.g., when a predetermined air pressure difference threshold between compartments 102a and 102b is exceeded). For example, control unit 392 of door system 390 may measure the relative pressure difference between the compartments. If desired, one or more pressure sensors may measure the air pressure in the respective compartments, and control unit 392 may monitor the one or more pressure sensors.

In some embodiments, control unit 392 may generate and send a trigger signal to the door locking system (e.g., door locking system 260 of FIG. 2) and activation mechanism 388 when the predetermined air pressure difference threshold between the compartments is exceeded. If desired, activation mechanism 388 may include electrical activation element 388a that activates activation mechanism 388 in response to the trigger signal from control unit 392 of door system 390.

In this scenario, the door locking system may rapidly unlock door panel 340. For example, door locking system may have an electrical locking apparatus and a rapid release mechanism. The rapid release mechanism may cut the current to the electrical locking apparatus, thereby unlocking the door locking system. In some embodiment, activation mechanism 388 of door system 390 may include an override mechanism that overrides the door locking system.

Door panel 340 may move from a closed position to an open position with rotational movement 386. During rotational movement 386 of door panel 340 from the closed position to the open position, door panel 340 may have a comparatively high kinetic energy which provides a comparatively high acceleration. The acceleration of door panel 340 during rotational movement 386 may be based on a predetermined mass inertia of door panel 340.

Bolt moving mechanism 384 may exert a predetermined pressure on bolt 383, which in turn pushes brake element 382 onto floor structure 385 to decelerate rotational movement 386 during the opening of door panel 340. The predetermined pressure may be selected based on the predetermined mass inertia of door panel 340.

Brake element 382 may convert the kinetic energy of door panel 340 to thermal energy through friction. Brake element 382 may recover quickly from an increase in temperature. Brake element 382 may be made from a material that enables a smooth and even contact with floor structure 385 during rotational movement 386 of door panel 340. For example, brake element 382 may include a material such as sintered glass, aramid, cellulose, composite materials, sintered steel, composed clay bonded to copper, composed porcelain bonded to copper, etc.

In some embodiments, activation mechanism 388 may release latch mechanism 387. As an example, activation mechanism 388 may release latch mechanism 387 in response to a trigger signal from control unit 392. As another example, activation mechanism 388 may include a mechanical activation element 388a that releases latch mechanism 387.

Thereby, activation mechanism 388 may switch latch mechanism 387 from a normal mode to a deceleration mode. For example, by exerting a rotational force onto pivot arm 387a, pivot arm 387a may pull blocking component 387b from bolt moving mechanism 384. Thus, bolt moving mechanism 384 may press bolt 383 against brake element 382.

The interface between bolt moving mechanism 384 and blocking component 387b of latch mechanism 387 may provide a friction. The friction between bolt moving mechanism 384 and blocking component 387b may be based at least partially on the predetermined pressure that bolt moving mechanism 384 exerts on bolt 383. If desired, the friction may be based on a predetermined mass inertia of door panel 340 or on a combination of the predetermined pressure that bolt moving mechanism 384 exerts on bolt 383 and the predetermined mass inertia of door panel 340.

Figure 4A:
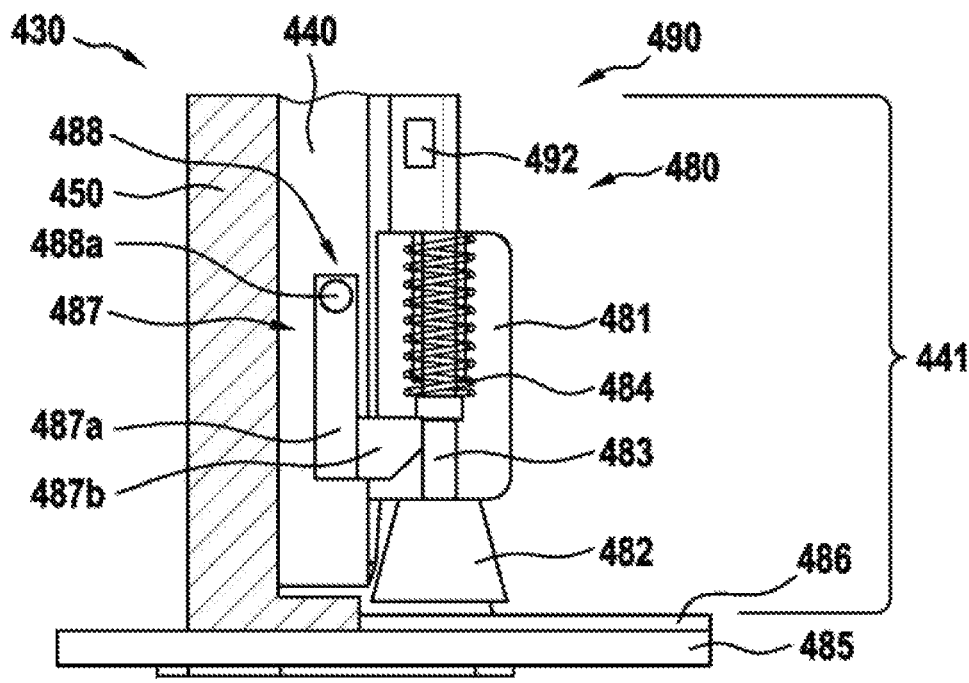
FIG. 4A is a diagram of an illustrative door module with a door panel in a closed position and a door system that includes a deceleration mechanism in a normal mode in accordance with some embodiments.
Figure 4B:
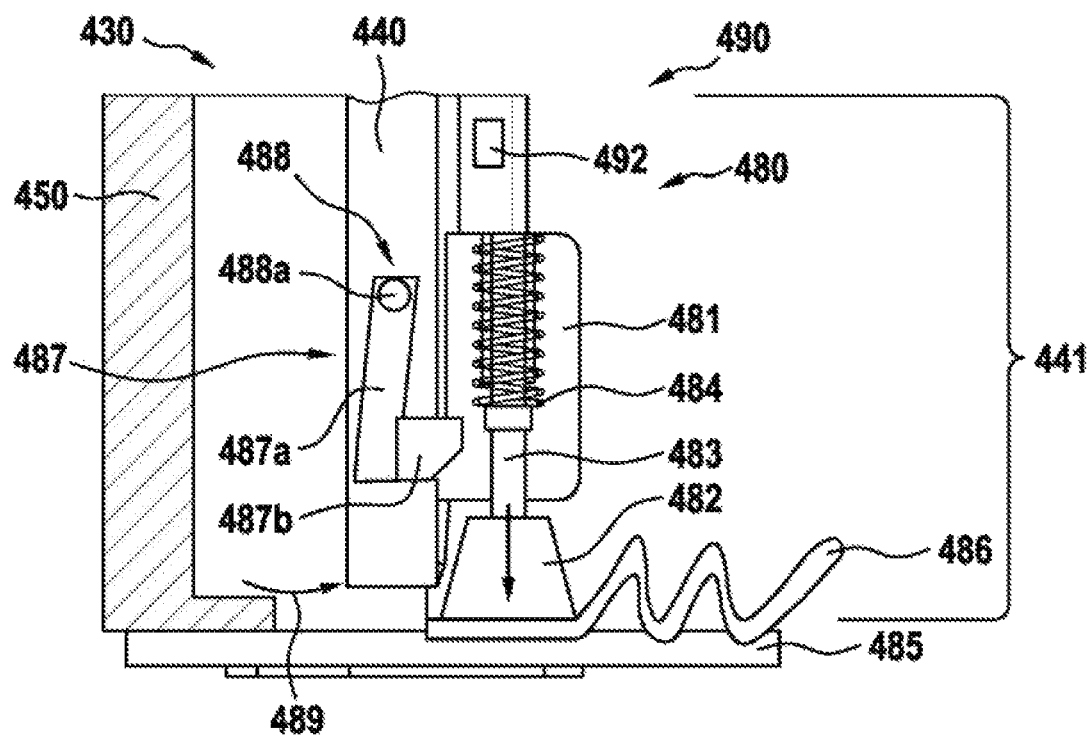
FIG. 4B is a diagram of an illustrative door module with a door panel with a rotational movement above a carpet and a door system that includes a deceleration mechanism in a deceleration mode in accordance with some embodiments.

FIGS. 4A and 4B show door module 430 with door panel 440 in a closed and an open position, respectively. Door module 430 may include door panel 440, door frame 450, and door system 490, which may include control unit 492 and deceleration mechanism 480. Deceleration mechanism 480 may be attached to a lower region 441 of door panel 440.

Door panel 440 may be placed perpendicular to floor structure 485. Floor structure 485 may be covered by a carpet 486. Deceleration mechanism 480 may include casing 481, bolt 483, brake element 482 that is rigidly attached to bolt 483, bolt moving mechanism 484 that is attached to bolt 483, latch mechanism 487 that is removably connected to bolt moving mechanism 484, and activation mechanism 488 that is attached to latch mechanism 487. Casing 481 may be attached to door panel 440 and may encompass bolt 483 and bolt moving mechanism 484.

In some embodiments, latch mechanism 487 may be connected to door panel 440. Latch mechanism 487 may include pivot arm 487a and blocking component 487b that is rigidly attached to pivot arm 487a. Blocking component 487b may be removably connected to bolt moving mechanism 484 and may be adapted to block bolt moving mechanism 484 in the normal mode.

If desired, bolt, moving mechanism 484 may include a spring-loaded mechanism. For example, as shown in FIG. 4A, bolt moving mechanism 484 may include a spring that is attached to bolt 483. The spring may be loaded in response to a compression that is provided by blocking component 487b.

Activation mechanism 488 may be attached to pivot arm 487a of latch mechanism 487. Activation mechanism 483 may switch latch mechanism 487 from the normal mode to a deceleration mode by exerting a rotational force to pivot arm 487a when the predetermined air pressure difference threshold between the compartments (e.g., compartments 102a, 102b of FIG. 1) is exceeded.

If desired, activation mechanism 488 may include activation element 488a that activates activation mechanism 488 in response to a trigger. As an example, the trigger may be a trigger signal that is provided by control unit 492 of door system 490.

Control unit 492 may be connected to activation mechanism 488 and/or a door locking system (e.g., door locking system 260 of FIG. 2) that maintains door panel 440 in the closed position. Control unit 492 may generate a trigger signal when the predetermined air pressure difference threshold between the compartments (e.g., compartments 102a, 102b of FIG. 1) is exceeded. Activation mechanism 488 may include an electrical activation element 488a that is adapted to activate activation mechanism 488 in response to the trigger signal from the control unit 492.

In some embodiments, activation mechanism 488 may override the door locking system such that the door locking system no longer maintains door panel 440 in the closed position. In other words, door panel 440 may be opened. For example, door panel 440 may perform a rotational movement above carpet 486 from the closed to an open position.

If desired, electrical activation element 488a may include a solenoid, an electrical actuator, a pyrotechnic actuator, or a gas cartridge.

As an example, consider the scenario in which the air pressure difference between compartments that are separated by door module 430 (e.g., compartments 102a, 102b of FIG. 1) needs to be equalized rapidly (e.g., when a predetermined air pressure difference threshold between the compartments is exceeded). If desired, the control unit 492 of door system 490 may measure the relative pressure difference between the compartments, for example using one or more pressure sensors.

In some embodiments, control unit 492 may generate the trigger signal and send the trigger signal to activation mechanism 488 when the predetermined air pressure difference threshold between the compartments is exceeded. If desired, activation mechanism 488 may include electrical activation element 488a that activates activation mechanism 488 in response to the trigger signal of the control unit 492 of door system 490.

Door module 430 may have a door locking system (e.g., door locking system 260 of FIG. 2) that maintains door panel 440 in the closed position. Activation mechanism 488 may override the door locking system, thereby unlocking door panel 440.

In this scenario, door panel 440 may perform a rotational movement 489 from a closed position shown in FIG. 4A to the open position shown in FIG. 4B. For example, the difference in pressure between the compartments may push door panel 440 open once the door locking system no longer maintains door panel 440 in the closed position.

During rotational movement 489 of door panel 440 from the closed position to the open position, door panel 440 may have a comparatively high kinetic energy. The acceleration of door panel 440 during rotational movement 489 may be associated with a predetermined mass inertia of door panel 440.

Bolt moving mechanism 484 may exert a predetermined pressure on bolt 483, and thus against brake element 482, thereby pushing brake element 482 onto floor structure 485 that is covered by carpet 486. The predetermined pressure on bolt 483 may be based on the predetermined mass inertia of door panel 440 and/or on the required deceleration capabilities of brake element 432 during the interaction with carpet 436 and/or floor structure 485.

In some embodiments, activation mechanism 488 may release latch mechanism 487 by moving blocking component 487b from bolt moving mechanism 484. The interface between bolt moving mechanism 484 and blocking component 487b of latch mechanism 487 may provide a friction. The friction between bolt, moving mechanism 484 and blocking component 487b may depend at least partially on the predetermined pressure that bolt moving mechanism 484 exerts on bolt 483 and/or the mass inertia force of door panel 440. For example, the predetermined pressure on bolt 483 may be selected such that mass inertia force of door panel 440 is high enough for latch mechanism 487 to overcome the friction between bolt moving mechanism 484 and blocking component 487b during a rapid opening of door panel 440, thereby releasing bolt moving mechanism 484.

Brake element 482 may detach carpet 486 from floor structure 485 to decelerate rotational movement 489 of door panel 440. For example, as shown in FIG. 4B, brake element 482 may produce more and more carpet wrinkles of carpet 486 during the rotational movement 489 of door panel 440. An increase in the number and/or size of the carpet wrinkles may lead to an increasing deceleration of the rotation movement 489 of door panel 440.

In some embodiments, an obstacle such as a side wall and/or a mechanical end stop of door module 430 (e.g., mechanical end stop 220 of FIG. 2) may completely stop the rotational movement 489 of door panel 440. In other words, the obstacle may absorb the remaining kinetic energy of door panel 440.

Brake element 482 may fold carpet 486 against the obstacle. Folding carpet 486 against the obstacle may provide a dampening for the door panel 440 before the rotational movement 489 is completely stopped.

Carpet 486 may have a predetermined shape. For example, carpet 486 may have a polygonal shape. As another example, carpet 486 may be arc-shaped. Carpet 486 may at least partially cover the surface of floor structure 485 above which door panel 440 performs rotational movement 489.

The shape and/or the material and/or the thickness of carpet 486 may be selected to achieve a predetermined folding or wrinkling scheme. As an example, the predetermined folding or wrinkling scheme may provide for a predetermined number of wrinkles in the carpet when door panel 440 reaches the obstacle. As another example, the predetermined folding or wrinkling scheme may provide for a predetermined height and width of the wrinkles, etc.

Figure 5:
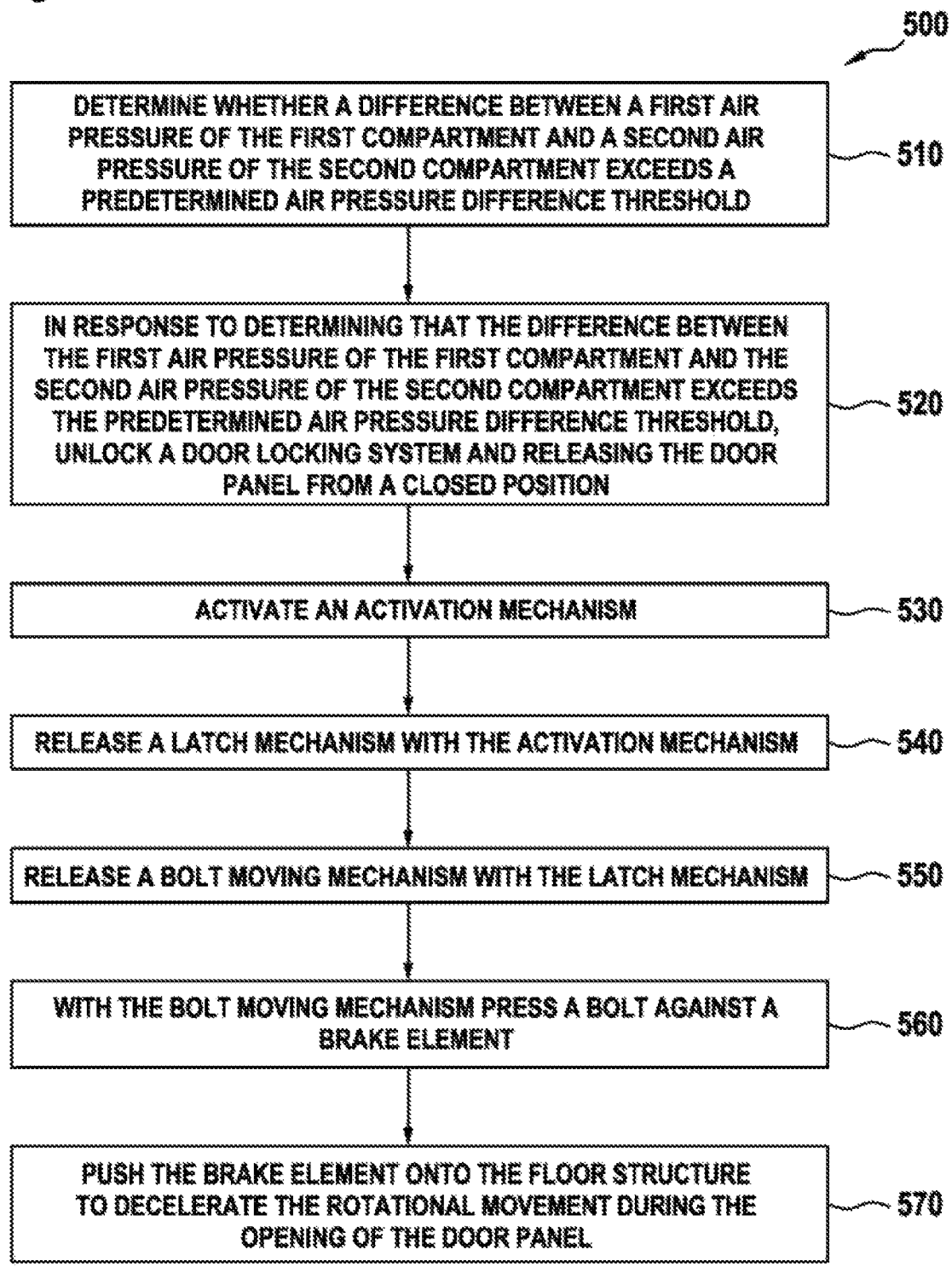
FIG. 5 is a diagram of a flow chart showing illustrative operations for controlling an opening of a door module by using a door system in accordance with some embodiments.

FIG. 5 is a flow chart 500 showing illustrative operations of using a door system for controlling an opening of a door module that separates first and second compartments of an aircraft. The door module may include a door panel that performs a rotational movement above a floor structure of the aircraft during an opening of the door module.

During operation 510, the door system may determine whether a difference between a first air pressure of the first compartment and a second air pressure of the second compartment exceeds a predetermined air pressure difference threshold.

For example, door system 290 of FIG. 2 may be installed on door module 230 that separates compartments of an aircraft (e.g., compartments 102a, 102b of aircraft 100 of FIG. 1). The door system 290 may determine that the air pressure difference between the compartments that are separated by door module 230 exceeds a predetermined air pressure difference threshold.

In response to determining that the difference between the first air pressure of the first compartment and the second air pressure of the second compartment exceeds the predetermined air pressure difference threshold, the door system may unlock a door locking system and release the door panel from a closed position, during operation 520.

For example, in response to determining that the difference between the air pressure of the compartments that are separated by door module 230 of FIG. 2 exceeds the predetermined air pressure difference threshold, door system 290 may unlock door locking system 260 and may release door panel 240 from the closed position.

During operation 530, the door system may activate an activation mechanism. For example, door system 490 of FIG. 4A or 4B may activate activation mechanism 488.

During operation 540, the door system may release a latch mechanism with the activation mechanism. For example, door system 490 of FIG. 4A or 4B may release latch mechanism 487 with activation mechanism 483.

During operation 550, the door system may release a bolt moving mechanism with the latch mechanism. For example, door system 490 of FIG. 4A or 4B may release bolt moving mechanism 484 with latch mechanism 487.

During operation 560, the door system may, with the bolt moving mechanism, press a bolt against a brake element. For example, door system 490 of FIG. 4A or 4B may use bolt moving mechanism 484 to press bolt 483 against brake element 482.

During operation 570, the door system may push the brake element onto the floor structure to decelerate the rotational movement during the opening of the door panel. For example, door system 490 of FIG. 4A or 4B may push brake element 482 onto floor structure 485 to decelerate rotational movement 489 during the opening of door panel 440.

It should be noted that the above-described embodiments are merely described for illustration purposes, but not in order to restrict the present invention thereto. Instead, multiple modifications and variations of the presented embodiments are possible and should, therefore, also be considered as being part of the invention.

For example, deceleration mechanism 380 or 480 of FIG. 3A, 3B, 4A, or 4B are shown partially integrated in door panel 340 and 440. However, deceleration mechanism 380 and 480 may be completely integrated or completely detachably attached to door panel 340 and 440. For example, casing 381, 481 of deceleration mechanism 380, 480 may include latch mechanism 387, 487, and be detachably mounted on door panel 340, 440. As another example, casing 381, 481 of deceleration mechanism 380, 480 may be fully integrated to door panel 340, 440 which provides a smooth and straight surface on door panel 340, 440.

As another example, latch mechanism 387, 487 of FIG. 3A, 3B, 4A, or 4B is shown with blocking component 387b, 487b that has a cross-section shape in form of a square from which a triangle was removed. However, blocking component 387b, 487b may have any cross-section shape that is suitable to block bolt moving mechanism 384, 434. For example, blocking component 387b, 487b may have a cross-section shape in form of a regular trapezoid shape, a triangular shape, a rectangular shape, a square shape, etc.

Furthermore, bolt moving mechanism 384, 484 of FIG. 3A, 3B, 4A, or 4B is shown having a compression spring. However, bolt moving mechanism 384, 484 may include any suitable mechanism that presses bolt 333, 483 against brake element 382, 482. For example, bolt moving mechanism 384, 484 may include a piston arm, a torsion spring, a rubber band, an extension spring, etc., or a combination thereof.

REFERENCE LIST 100 aircraft
102 fuselage
102a, 102b compartments
103 door module
185 floor structure
220 mechanical end stop
230 door module
240 door panel
241 lower region of the door panel
250 door frame
260 door locking system
270 door damper
280 deceleration mechanism
281 casing
282 brake element
285 floor structure
290 door system
330 door module
340 door panel
341 lower region of the door panel
350 door frame
380 deceleration mechanism
381 casing
382 brake element
383 bolt
384 bolt moving mechanism
385 floor structure
386 rotational movement
387 latch mechanism
387a pivot arm
387b blocking component
388 activation mechanism
388a mechanical activation element
390 door system
392 control unit
430 door module
440 door panel
441 lower region of the door panel
450 door frame
480 deceleration mechanism
481 casing
482 brake element
483 bolt
484 bolt moving mechanism
485 floor structure
486 carpet
487 latch mechanism
487a pivot arm
487b blocking component
488 activation mechanism
488a activation element
489 rotational movement
490 door system
492 control unit
500 flow chart
510, 520, 530, 540, 550, 560, 570 operations

What is claimed is:

1. A door system that is adapted to control opening of a door module that separates compartments of an aircraft, the door module comprising a door panel that performs a rotational movement above a floor structure of the aircraft during opening of the door module, comprising:
a deceleration mechanism that is attached to a lower region of the door panel and comprises:
a bolt,
a bolt moving mechanism that is attached to the bolt,
a latch mechanism that is removably connected to the bolt moving mechanism and adapted to block the bolt moving mechanism in a normal mode and to release the bolt moving mechanism in a deceleration mode,
an activation mechanism that is attached to the latch mechanism and adapted to switch the latch mechanism from the normal mode to the deceleration mode when a predetermined air pressure difference threshold between the compartments of the aircraft is exceeded, and a brake element that is rigidly attached to the bolt, wherein the bolt moving mechanism, upon release, presses the bolt against the brake element such that the brake element pushes against the floor structure, thereby decelerating the rotational movement of the door panel.

2. The door system of claim 1, wherein the door module further comprises:
a door locking system that is arranged on the door panel and maintains the door panel in the closed position.

3. The door system of claim 2, wherein the door locking system is adapted to release the door panel from the closed position when the predetermined air pressure difference threshold between the compartments of the aircraft is exceeded.

4. The door system of claim 2, further comprising:
a control unit that is connected to at least one of the activation mechanism or the door locking system and generates a trigger signal when the predetermined air pressure difference threshold between compartments is exceeded.

5. The door system of claim 4, wherein the activation mechanism further comprises:
an electrical activation element that is adapted to activate the activation mechanism in response to the trigger signal of the control unit.

6. The door system of claim 5, wherein the electrical activation element comprises at least one of a solenoid, an electrical actuator, a pyrotechnic actuator, or a gas cartridge.

7. The door system of claim 1, wherein the activation mechanism comprises:
a mechanical activation element that activates the activation mechanism when an acceleration of the rotational movement of the door panel is above a predetermined acceleration threshold.

8. The door system of claim 7, wherein the predetermined acceleration threshold is selected based on a predetermined mass inertia of the door panel.

9. The door system of claim 8, wherein the bolt moving mechanism exerts a predetermined pressure on the bolt that is selected at least based on the predetermined mass inertia of the door panel.

10. The door system of claim 9, wherein the bolt moving mechanism and the latch mechanism exhibit an interface with a friction that is based on the predetermined pressure that the bolt moving mechanism exerts on the bolt.

11. The door system of claim 1, wherein the floor structure is covered by a carpet, and wherein the brake element detaches the carpet from the floor structure in the deceleration mode.

12. A method of using the door system of claim 1 for controlling an opening of a door module that separates first and second compartments of an aircraft, the door module comprising a door panel that performs a rotational movement above a floor structure of the aircraft during an opening of the door module, the method comprising:
determining whether a difference between a first air pressure of the first compartment and a second air pressure of the second compartment exceeds a predetermined air pressure difference threshold;
in response to determining that the difference between the first air pressure of the first compartment and the second air pressure of the second compartment exceeds the predetermined air pressure difference threshold, unlocking a door locking system and releasing the door panel from a closed position;
activating an activation mechanism;
releasing a latch mechanism with the activation mechanism;
releasing a bolt moving mechanism with the latch mechanism;
with the bolt moving mechanism pressing a bolt against a brake element; and
pushing the brake element onto the floor structure to decelerate the rotational movement during the opening of the door panel.

13. The method of claim 12, wherein the floor structure is covered by a detachable carpet, and wherein pushing the brake element onto the floor structure to decelerate the rotational movement during the opening of the door panel further comprises:
detaching the detachable carpet with the brake element; and
wrinkling the detachable carpet to decelerate the rotational movement during the opening of the door panel.

14. The method of claim 12, wherein the activation mechanism comprises a hinge, and wherein releasing the bolt moving mechanism with the latch mechanism further comprises:
moving the latch mechanism relative to the bolt moving mechanism based on a mass inertia of the door panel.

15. The method of claim 12, wherein the activation mechanism comprises at least one of a solenoid, an electric actuator, a pyrotechnical activation device, or a gas cartridge, and wherein releasing the bolt moving mechanism with the latch mechanism further comprises:
moving the latch mechanism relative to the bolt moving mechanism with the at least one of a solenoid, an electric actuator, a pyrotechnical activation device, or a gas cartridge.

16. A door system for a door module that separates compartments of an aircraft, the door module comprising a door panel that performs a rotational movement above a floor structure of the aircraft during opening of the door module, comprising:
a door panel decelerator attached to a lower region of the door panel, the door panel decelerator comprising:
a biased bolt, the biased bolt blocked in a normal mode and released in a deceleration mode,
an activator attached to the biased bolt to switch the biased bolt from the normal mode to the deceleration mode when a predetermined air pressure difference threshold between the compartments of the aircraft is exceeded, and
a brake rigidly attached to the bolt, wherein the biased bolt, upon release, presses the biased bolt against the brake such that the brake pushes against the floor structure, thereby decelerating the rotational movement of the door panel.

17. The door system of claim 16, wherein the door module further comprises:
a door lock arranged on the door panel to maintain the door panel in a closed position, wherein the door lock is adapted to release the door panel from the closed position when the predetermined air pressure difference threshold between the compartments of the aircraft is exceeded.

18. The door system of claim 17, further comprising:
a controller connected to at least one of the activator or the door lock, the controller generating a trigger signal when the predetermined air pressure difference threshold between compartments is exceeded, and wherein the activator further comprises:

an electrical activator adapted to activate the activator in response to the trigger signal of the controller.

19. A door system adapted to control opening of a door that separates compartments of an aircraft, the door comprising a door panel rotatable above a floor of the aircraft during the opening of the door, comprising:
- a door panel decelerator attached to a lower region of the door panel, the door panel decelerator comprising:
  - a striker,
  - a striker mover attached to the striker,
  - a latch removably connected to the striker mover and adapted to block the striker mover in a normal mode and to release the striker mover in a deceleration mode,
  - an activator attached to the latch and adapted to switch the latch from the normal mode to the deceleration mode when a predetermined air pressure difference threshold between the compartments of the aircraft is exceeded, and
  - a brake attached to the striker, wherein the striker mover, upon release, presses the striker against the brake such that the brake pushes against the floor, thereby decelerating the rotational movement of the door panel.

20. The door system of claim 19, wherein the activator comprises:
- a mechanical activator that activates the activator when an acceleration of the rotational movement of the door panel is above a predetermined acceleration threshold.

* * * * *